United States Patent
Zhai et al.

(10) Patent No.: US 9,679,365 B2
(45) Date of Patent: Jun. 13, 2017

(54) PROCESSING HIGH DYNAMIC RANGE IMAGES

(71) Applicant: THOMSON LICENSING, Issy de Moulineaux (FR)

(72) Inventors: Jiefu Zhai, Cupertino, CA (US); Zhe Wang, Plainsboro, NJ (US); Dong Tian, Boxborough, MA (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/439,706

(22) PCT Filed: Nov. 16, 2012

(86) PCT No.: PCT/US2012/065403
§ 371 (c)(1),
(2) Date: Apr. 30, 2015

(87) PCT Pub. No.: WO2014/077827
PCT Pub. Date: May 22, 2014

(65) Prior Publication Data
US 2015/0302562 A1  Oct. 22, 2015

(51) Int. Cl.
*G06K 9/36* (2006.01)
*G06T 5/00* (2006.01)
(Continued)

(52) U.S. Cl.
CPC ............... *G06T 5/007* (2013.01); *G06T 5/50* (2013.01); *H04N 19/30* (2014.11); *H04N 19/44* (2014.11);
(Continued)

(58) Field of Classification Search
CPC .................. H04N 19/46; H04N 19/59; G06T 2207/20028; G06T 2207/20208; G06T 5/007
See application file for complete search history.

(56) References Cited

U.S. PATENT DOCUMENTS 6,449,596 B1  9/2002  Ejima
7,146,059 B1  12/2006  Durand et al.
(Continued)

FOREIGN PATENT DOCUMENTS

JP  9261066  10/1997
JP  2007243942  9/2007
(Continued)

OTHER PUBLICATIONS

Ward, Greg, and Maryann Simmons. "Subband encoding of high dynamic range imagery." Proceedings of the 1st Symposium on Applied Perception in Graphics and Visualization. ACM, 2004.*
(Continued)

*Primary Examiner* — Li Liu
(74) *Attorney, Agent, or Firm* — Brian J. Dorini; Ronald J. Kolczynski

(57) ABSTRACT

Various implementations address high dynamic range ("HDR") images. In one particular implementation, a low dynamic range ("LDR") image is generated from an HDR image, and information is generated allowing the HDR image to be reconstructed from the LDR image. The LDR image and the information are encoded. In another implementation, a signal or signal structure includes an LDR section including the encoded LDR image, and an information section including the encoded information. In another implementation, the encoded LDR image and the encoded
(Continued)

information are both decoded. The HDR image is then reconstructed based on the decoded LDR image and the decoded information.

30 Claims, 5 Drawing Sheets

(51) Int. Cl.
  *G06T 5/50* (2006.01)
  *H04N 19/46* (2014.01)
  *H04N 19/30* (2014.01)
  *H04N 19/44* (2014.01)

(52) U.S. Cl.
  CPC .... *H04N 19/46* (2014.11); *G06T 2207/20208* (2013.01)

(56) References Cited

U.S. PATENT DOCUMENTS

| | | | | |
|---|---|---|---|---|
| 8,599,289 | B2* | 12/2013 | Hong | G06K 9/40 348/241 |
| 8,675,115 | B1* | 3/2014 | Gigushinski | H04N 5/3572 348/222.1 |
| 2007/0076971 | A1 | 4/2007 | Roimela et al. | |
| 2007/0201560 | A1 | 8/2007 | Segall et al. | |
| 2007/0223813 | A1 | 9/2007 | Segall et al. | |
| 2009/0175338 | A1 | 7/2009 | Segall | |
| 2010/0172411 | A1* | 7/2010 | Efremov | H04N 19/136 375/240.12 |
| 2010/0195901 | A1 | 8/2010 | Andrus et al. | |
| 2011/0235720 | A1* | 9/2011 | Banterle | G06T 5/009 375/240.25 |
| 2012/0230597 | A1* | 9/2012 | Ward | G06T 5/009 382/233 |
| 2012/0237130 | A1* | 9/2012 | Wang | G06T 5/009 382/224 |
| 2013/0083838 | A1* | 4/2013 | Touze | H04N 5/2355 375/240.01 |
| 2014/0037206 | A1* | 2/2014 | Newton | H04N 19/597 382/166 |
| 2015/0201222 | A1* | 7/2015 | Mertens | H04N 19/46 382/233 |

FOREIGN PATENT DOCUMENTS

| | | |
|---|---|---|
| JP | 2007257641 | 10/2007 |
| JP | 2009524371 | 6/2009 |
| JP | 2011509536 | 3/2011 |
| JP | 2012520619 | 9/2012 |
| KR | 1007101 | 1/2011 |
| WO | WO2010036250 | 4/2010 |
| WO | WO2010105036 | 9/2010 |
| WO | WO2011031331 | 3/2011 |
| WO | WO2011046607 | 4/2011 |
| WO | WO2012027405 | 3/2012 |
| WO | WO2012147010 | 11/2012 |

OTHER PUBLICATIONS

Mai etal. "Optimizing a Tone Curve for Backward-Compatible High Dynamic Range Image and Video Compression," IEEE Transactions on Image Processing, vol. 20, No. 6, Jun. 1, 2011, pp. 1558-1571.

Mantiuk etal. "Backward Compatible High Dynamic Range MPEG Video Compression," ACM Transactions on Graphics (TOG), US, Jul. 30, 2006, pp. 713-723.

Segall, "Scalable Coding of High Dynamic Range Video," IEEE International Conference on Image Processing, 2007 (ICIP 2007), Sep. 1, 2007, pp. I-1 to I-4.

Mantiuk et al: "High Dynamic Range Image and Video Compression—Fidelity Matching Human Visual Performance", IEEE Year 2007, vol. 1, pp. I-9-I-12.

Qiu et al: "Tone mapping HDR images using optimization: A general Framework", Proceedings of 2010 IEEE 17th International Conference on Image Processing, Sep. 26-29, 2010. pp. 3129-3132.

Jo et al., HDR Image Generation Based on Intensity Clustering and Local Features Analysis, Computers in Human Behavior, vol. 27, (2011), pp. 1507-1511.

* cited by examiner

PROCESSING HIGH DYNAMIC RANGE IMAGES

This application claims the benefit, under 35 U.S.C. §365 of International Application PCT/US12/065403, filed 16 Nov. 2012, which was published in accordance with PCT Article 21(2) on 22 May 2014, in English.

BACKGROUND

Technology is allowing more complex images, such as, for example, images that can exhibit a larger range of color or brightness. Such images are frequently referred to as HDR images. In contrast, standard images are frequently referred to as low dynamic range ("LDR") images. Coding HDR images presents a variety of technical challenges.

SUMMARY

According to a general aspect, a lower dynamic range image is generated from a higher dynamic range. Information is generated from the higher dynamic range image allowing a reconstruction of the higher dynamic range image. The lower dynamic range image and the information are encoded.

According to another general aspect, a signal or signal structure includes a lower dynamic range section that includes an encoded lower dynamic range image. The signal or signal structure further includes an information section that includes encoded information. The information allows a reconstruction of a higher dynamic range image from the lower dynamic range image.

According to another general aspect, an encoded lower dynamic range image is decoded. Encoded information is also decoded. The information allows a reconstruction of a higher dynamic range image from the lower dynamic range image. The higher dynamic range image is reconstructed based on the decoded lower dynamic range image and the decoded information.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Figure 1:
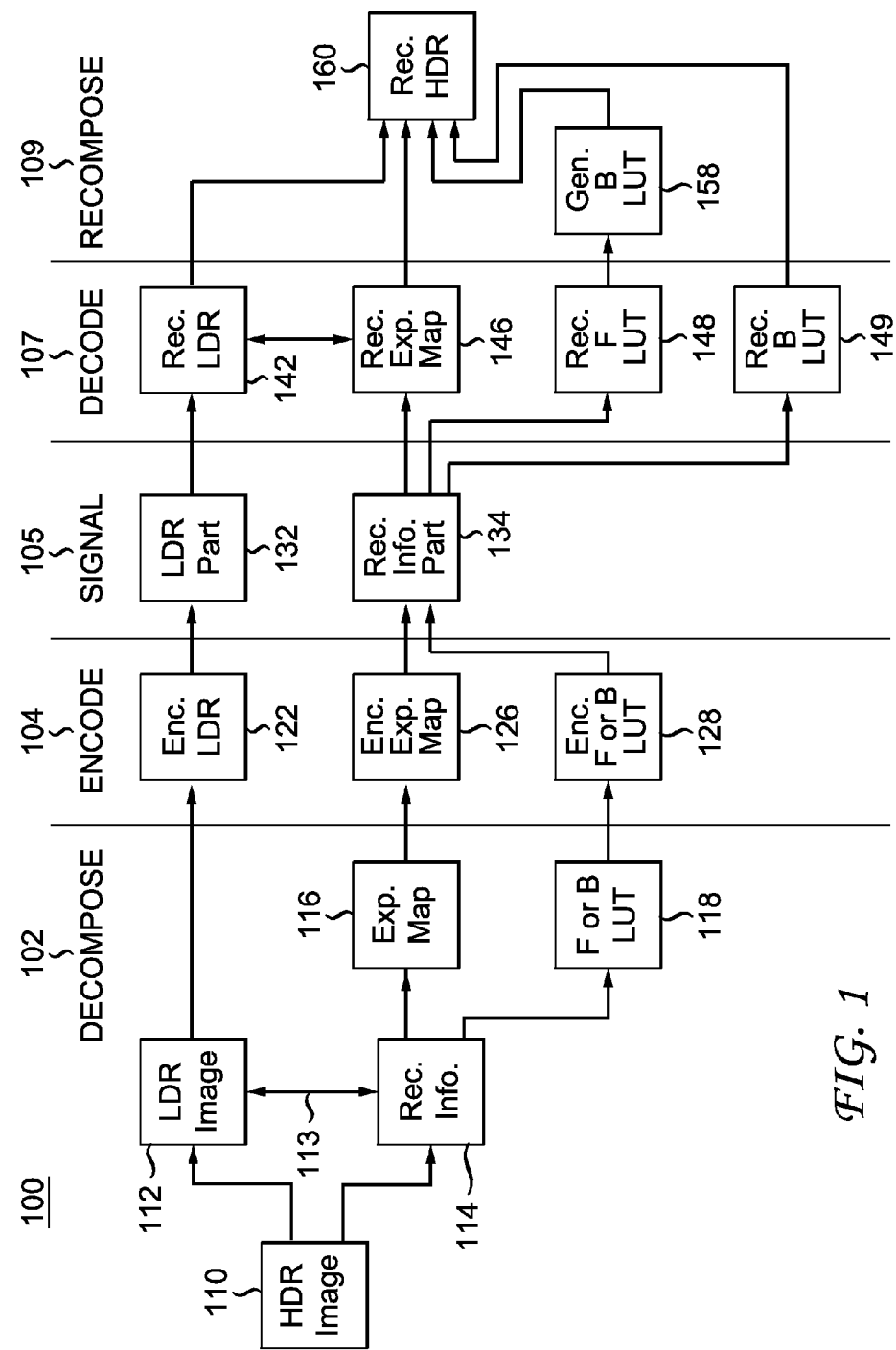
FIG. 1 is a flow diagram depicting an implementation of an apparatus and process for processing HDR images.

As a preview of some of the features presented in this application, at least one implementation describes the decomposition of an HDR image into and LDR image and either an exposure map or a look-up table ("LUT"). The LDR image, along with either the exposure map or the LUT, are encoded and inserted into a bitstream for transmission for storage. The LDR image and the exposure map may be jointly encoded in some manner. For example, the exposure map may be coded based on a reconstruction of an encoded LDR image. A receiver accesses the bitstream by, for example, receiving a transmission having the encoded data reading the bitstream from a storage device. A decoder at the receiving end then decodes the LDR image and, if present, the exposure map or the LUT. Based on the decoded information, the receiver recomposes the HDR image. We discuss in more detail below various implementations, including exposure map implementations and LUT implementations.

Continuing the preview, various implementations that involve an exposure map can be characterized generally as having the following steps for encoding an HDR video signal:

1. HDR decomposition: decompose the original HDR signal into two layers, an LDR layer and an exposure map layer.

An exposure map is typically defined as a two dimensional matrix in which each entry represents the multiplier (or gain) that can be used to recover the HDR source from the LDR image at corresponding pixel coordinates. This means that for each pixel coordinate (x,y), the following equation holds:

$$H_{x,y} = C * f(L_{x,y}) * 2^{E_{x,y}}$$

where, f(•) is inverse response function that maps a gamma corrected value to a linear value, C is a constant that results in the LDR image and the exposure map being in a desired, or reasonable, numerical range, H is the HDR source value, L is the LDR image value, and E is the exposure map value.

From the above definition, there could be many ways to decompose an HDR image/video. However, for compression applications, various implementations decompose the HDR source in such a way that the exposure map is a piece-wise smooth signal. That means that the exposure map has strong correlations with large-scale edges in the original HDR image, while smoothing out small-scale details in the HDR image.

Note that various implementations determine the exposure map based on the HDR source value and a reconstructed value of the LDR image value. That is, the LDR image value is encoded and decoded to produce a reconstructed LDR image value. This reconstructed LDR image value is then used, along with the original HDR source value, to determine the exposure map value. In some of these implementations, the exposure map is losslessly encoded, thus possibly allowing perfect recomposition of the HDR source value.

2. Compress the LDR layer using a conventional video coding scheme such as, for example, H.264 (that is, the existing International Organization for Standardization/International Electrotechnical Commission ("ISO/IEC") Moving Picture Experts Group-4 ("MPEG-4") Part 10 Advanced Video Coding ("AVC") standard/International Telecommunication Union, Telecommunication Sector ("ITU-T") H.264 Recommendation (hereinafter the "H.264/MPEG-4 AVC Standard" or variations thereof, such as the "AVC standard", the "H.264 standard", or simply "AVC" or "H.264").

3. Use a reconstructed LDR layer to aid the compression of the exposure map layer.

Additionally, various implementations that involve an exposure map can be characterized generally as having the following steps at the decoder side:

1. Extract the bitstream that belongs to the LDR layer and decode the LDR layer using a conventional decoder.
2. Use the reconstructed LDR frames to aid the decoding of the exposure map layer.
3. Combine the reconstructed LDR layer, and the decoded exposure map layer, to reconstruct the HDR video signal.

Referring to FIG. 1, a flow diagram is provided that illustrates components of a system 100 that applies to several different implementations. FIG. 1 will be used to discuss various implementations.

The system 100 includes five sections. These are a decompose section 102, an encode section 104, a signal section 105, a decode section 107, and a recompose section 109.

The decompose section 102 can also be referred to as a decomposition section. The decompose section 102 receives an HDR image 110 and decomposes the HDR image 110 into an LDR image 112 and recomposition information 114.

An HDR image is frequently defined as an image having more than 8 bits per pixel Conversely, an LDR image is frequently defined as an image having 8 or fewer bits per pixel. However, the terms HDR and LDR are relative terms and can refer to images having any number of bits per pixel. Accordingly, at times in this application, the terms "higher" dynamic range and "lower" dynamic range are used to refer to these images.

An arrow 113 connects the LDR image 112 and the recomposition information 114. The arrow 113 indicates that, in various implementations, either the LDR image 112 is based on the recomposition information 114, or the recomposition information 114 is based on the LDR image 112, or both, as further explained below.

The recomposition information 114 is, for example, in different implementations discussed in this application, either an exposure map 116 or a LUT 118. The LUT 118 is, for example, either a forward LUT or a backward LUT (abbreviated in FIG. 1 as "F or B LUT"). A forward LUT, as further explained below, provides the LUT that is used to determine the LDR image 112 from the HDR image 110. A backward LUT, as further explained below, provides the LUT that can be used to generate a recomposition of the HDR image 110 from a reconstruction of the LDR image 112. A backward LUT is often the inverse of a forward LUT, or is based on the forward LUT in some manner.

Recomposition information 114, more generally, can be used in recomposing the HDR image 110 from the LDR image 112. Recomposition information is, in different implementations, a component of the HDR image 110, information describing a decomposition of the HDR image 110 (for example, a forward LUT), or information describing the inverse of the decomposition (for example, a backward LUT). Recomposition information can, in various contexts, also be referred to as decomposition information or component information.

Recomposition information can also be referred to as reconstruction information. Reconstruction is a more general term than recomposition, and recomposing an HDR image can also be referred to as reconstructing an HDR image. Reconstructing an image refers, in general, to any process of generating the image from constituent or component information. The constituent or component information includes, for example, in different implementations, an LDR image, a LUT, an exposure map, a coding reference, or a residue. The reconstructed image can, in various implementations, be an estimate of the original image, or be the same as the original image. As should be clear, a recomposed image is a reconstructed image.

However, in this document, the term "recomposition" is generally used when referring to generating an HDR image by combining various component parts (for example, an LDR image and an exposure map or LUT). Additionally, in this document the term "reconstruction" is generally used when referring to the process of generating an image by decoding various syntax elements and using those decoded syntax elements to generate the image. A typical reconstruction process includes (i) decoding various syntax elements such as, for example, DCT coefficients representing a residue from encoding a picture, and information identifying a reference (for example, motion vectors, and coding mode indicators), and (ii) generating an estimate of the picture based on the decoded residue and the identified reference. At times, however, the term "reconstruction" is used in this document as a more general term that includes, and is broader than, "recomposition".

The encode section 104 receives the LDR image 112. The encode section 104 encodes the LDR image 112 to produce an encoded LDR image 122. The encode section 104 also receives, in various implementations, the exposure map 116. The encode section 104 encodes the exposure map 116 to produce an encoded exposure map 126. The encode section 104 also receives, in various implementations, the LUT 118. The encode section 104 encodes the LUT 118 to produce an encoded LUT 128 that is either a forward LUT or a backward LUT as explained previously.

The signal section 105 receives the encoded LDR image 122. The signal section 105 forms a signal, such as, for example, a bitstream suitable for transmission or storage. The signal section 105 forms an LDR signal portion 132 (abbreviated in FIG. 1 as "LDR part") of the signal based on the encoded LDR image 122. The signal section 105 also receives, in various implementations described in this application, either the encoded exposure map 126 or the encoded LUT 128. The signal section 105 forms a recomposition information signal portion 134 based on either, or possibly both, of the encoded exposure map 126 or the encoded LUT 128.

The decode section 107 receives the LDR signal portion 132. The decode section 107 decodes the LDR signal portion 132 to form a decoded LDR image which is also referred to as a reconstructed LDR image 142. The decode section 107 also receives the recomposition information signal portion 134. The decode section 107 decodes the recomposition information signal portion 134. Depending on what information is included in the recomposition information signal portion 134, the decode section 107 produces one, or possibly more, of (i) a reconstructed exposure map 146, (ii) a reconstructed forward LUT 148, or (iii) a reconstructed backward LUT 149.

The recompose section 109 can also be referred to as a recomposition section, or a reconstruction section. The recompose section 109 receives the reconstructed LDR image 142. The recompose section 109 also receives, if provided, one, or possibly more, of (i) the reconstructed exposure map 146, (ii) the reconstructed forward LUT 148, or (iii) the reconstructed backward LUT 149.

To recompose an HDR image using the reconstructed LDR image 142 and using a LUT, the recompose section 109 of the system 100 uses a backward LUT. That is, by definition, a backward LUT receives as input an LDR data value and provides as output an HDR data value. Accordingly, if a reconstructed forward LUT 148 is received, the recompose section 109 produces a generated backward LUT 158 based on the reconstructed forward LUT 148.

The recompose section 109 produces a recomposed HDR image 160. The recomposed HDR image 160 is based on the reconstructed LDR image 142 and one, or possibly more, of (i) the reconstructed exposure map 146, (ii) the generated backward LUT 158, or (iii) the reconstructed backward LUT 149.

Figure 2:
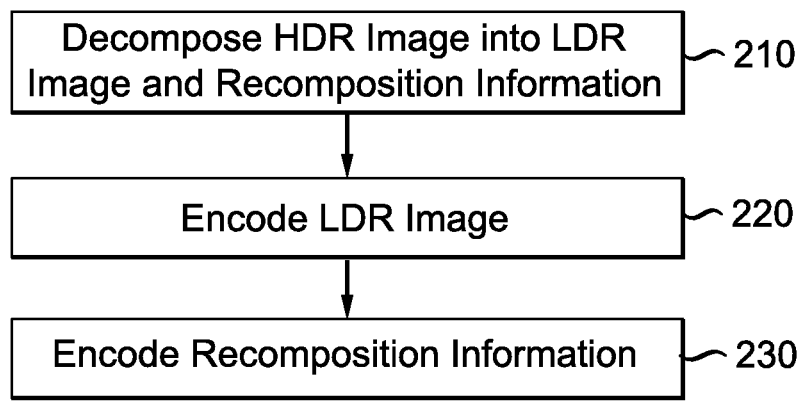
FIG. 2 is a flow diagram depicting an implementation of an encoding apparatus and process.

Referring to FIG. 2, a flow diagram illustrates a process 200 depicting an implementation of an encoding apparatus and process. The process 200 also depicts a structure for performing the recited operations of the process 200. Alternatively, the process 200 is performed, in various implementations, using the structure of the system 100.

The process 200 includes decomposing an HDR image into a LDR and recomposition information (210). The operation 210 is performed, in various implementations, by decomposing the HDR image 110 into the LDR image 112 and the recomposition information 114. The recomposition information allows a recomposition of the HDR image.

The process 200 also includes encoding the LDR image (220), and encoding the recomposition information (230). The operation 220 is performed, in various implementations, by the encode section 104 in producing the encoded LDR image 122. Similarly, the operation 230 is performed, in various implementations, by the encode section 104 in producing the encoded exposure map 126 or the encoded LUT 128.

Figure 3:
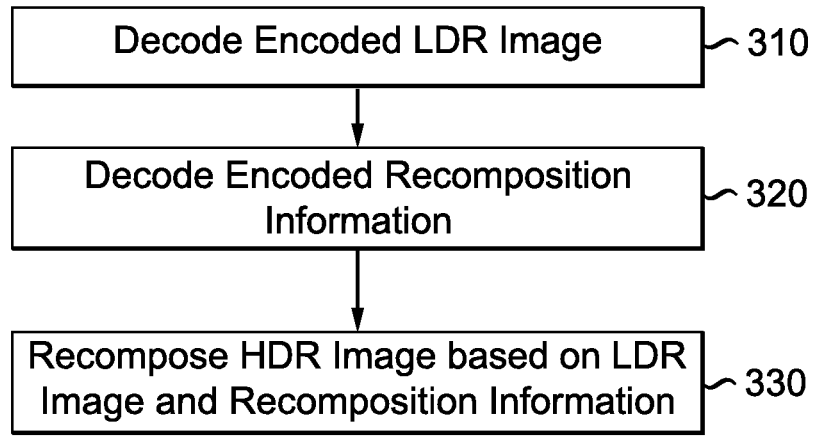
FIG. 3 is a flow diagram depicting an implementation of a decoding apparatus and process.

Referring to FIG. 3, a flow diagram illustrates a process 300 depicting an implementation of a decoding apparatus and process. The process 300 also depicts a structure for performing the recited operations of the process 300. Alternatively, the process 300 is performed, in various implementations, using the structure of the system 100.

The process 300 includes decoding an encoded LDR image (310). The operation 310 is performed, in various implementations, by producing the reconstructed LDR image 142.

The process 300 also includes decoding encoded recomposition information (320). The recomposition information allows a recomposition of an HDR image from the LDR image and the recomposition information. The operation 320 is performed, in various implementations, by the decode section 107 decoding the recomposition information signal portion 134 to produce one, or possibly more, of (i) the reconstructed exposure map 146, (ii) the reconstructed forward LUT 148, or (iii) the reconstructed backward LUT 149.

The process 300 also includes recomposing the HDR image based on the decoded LDR picture and the decoded recomposition information (330). The operation 330 is performed, in various implementations, by the recompose section 109 producing the recomposed HDR image 160 based on the reconstructed LDR image 142 and one, or possibly more, of (i) the reconstructed exposure map 146, (ii) the generated backward LUT 158, or (iii) the reconstructed backward LUT 149. In various implementations, the operation 330 also includes generating the generated backward LUT 158.

Several particular implementations of the process 200 will now be described in more detail. Various implementations decompose an HDR signal (possibly including multiple images) into multiple layers or components. There are a number of ways to decompose an HDR signal into, for example, two layers. Several implementations are described below that decompose an HDR signal into an LDR layer and an exposure map, thus performing one variation of the operation 210.

A first approach applies a tone mapping algorithm to each HDR image to obtain the tone mapped video, which is an LDR video signal. After applying the tone mapping algorithm, an exposure map is obtained using the following equation:

$$E(i, j) = Q\left(\log_2\left(\frac{H(i, j)}{f(L(i, j))}\right)\right) \quad (1)$$

In the above equation:
H(i,j) is the linear HDR luminance value.
  An HDR image can be in various color spaces, such as, for example, RGB (red-green-blue). In various implementations, we focus on the compression of the luminance channel, and use traditional methods to compress the chromatic channels. Further, HDR is a relative term depending on the context. In various implementations, an HDR pixel value is 10 bits, 12 bits, or a floating point representation.
L(i,j) is the 8-bit gamma corrected pixel value, which is, in certain implementations equal to the LDR pixel value that corresponds to H(i,j), divided by 255, with the resultant division result raised to the power of gamma.
  Gamma encoding is the name of a nonlinear operation used to code and decode luminance or tristimulus values in video or still image systems (see, for example, http://en.wikipedia.org/wiki/Gamma_correction). A typical value of gamma is 2.2, which is used in many computers.
  In the below equation, "x" is a gamma corrected pixel value, which has a range of 0 to 255. "Y" is the linear luminance value. "M" is a scaling constant that defines the maximum luminance of a specific system. For example, in a display system, "M" is the maximum luminance value.

$$y = M^*(x/255)^{2.2}$$

f( ) is the inverse response function that can convert a gamma corrected pixel value to a linear quantity.
  A linear quantity is typically desired because the HDR source is in the linear domain in many cases. "Linear" means that the luminance value is proportional to the number of photons that hit the sensor of a camera. In some terminology it is also called raw pixel data. An example of f( ) is the equation given above, which is:

$$y = M^*(x/255)^{2.2}$$

Q( ) is a quantization function that converts a floating point number to a fixed point number. Q( ) can be uniform or non-uniform. If Q( ) is non-uniform, then the decoder side typically needs to know how to do the inverse quantization when the decoder side receives the data. Side information may be transmitted.

The log function typically has the effect, among others perhaps, of reducing the range of the output.

Using the above approach to generate an exposure map can produce an exposure map that is not smooth. A non-smooth exposure map can be difficult to compress.

An alternative approach is to generate a "precise" exposure map first, and then to impose a smoothness constraint on the generated exposure map. A precise exposure map can be obtained, for example, using a bilateral filter on the HDR image as shown, for example, in the following reference which is hereby incorporated by reference in its entirety for all purposes: C. Tomasi, R. Manduchi, Bilateral Filtering for Gray and Color Images, 1998 Proceedings of the Sixth International Conference on Computer Vision, Page 839. The bilateral filter A precise exposure map can also be obtained, for example, using a weighted least square filter on the HDR image as shown, for example, in the following reference which is hereby incorporated by reference in its entirety for all purposes: Zeev Farbman et al. Edge-preserving decompositions for multi-scale tone and detail manipulation, ACM SIGGRAPH 2008.

The term "precise" may be unnecessary in certain frameworks. For example, using a weighted least square filter is a method to obtain an exposure map. In Zeev's paper listed above, a regularization method is used to enforce a smoothness constraint.

For example, in one implementation, suppose we have a logarithm-compressed HDR image (matrix H), obtained by applied logarithm function with 2 as the base, and we want to get an exposure map (matrix E). We would solve the following optimization problem:

$$J = \sum_{all(x,y)} \left( (H_{x,y} - E_{x,y})^2 + \lambda * F\left(\frac{\partial E_{x,y}}{\partial x}, \frac{\partial E_{x,y}}{\partial y}\right) \right)$$

Here the two-variable function F is the regularization function and could take the form as provided in the paper of Zeev et al. "λ" is a constant that controls the strength of the smoothness.

The smoothness constraint is implicit in the above optimization problem. This can be explained, for example, for the case of a bilateral filter. A bilateral filter applies a strong filtering when the neighboring pixels are similar, but applies a weak filtering when the neighboring pixels are quite different. As a result, sharp/strong edges are kept, but small-scale details are smoothed out. The weighted least filtering achieves the same general purpose using a different mathematical formulation.

Note that the above implementation determines the exposure map directly from the HDR image. In contract, Equation 1 uses the HDR image and the LDR image to determine the exposure map. Basically, once we have identified either the LDR map or the exposure map, the other is obtained immediately.

And then the LDR layer can be obtained by applying the precise exposure map, using Equation 2 below. Finally the precise exposure map is quantized to fixed point number and ready for compression. More specifically, given the precise exposure map $E_p(i, j)$, the red channel r of LDR layer can be obtained by:

$$r(i, j) = S\left(g\left(\frac{R(i, j)}{2^{E_p(i,j)}}\right)\right) \quad (2)$$

Where:
R(i,j) is the linear value of the red component of an HDR image,
g( ) is the gamma correction function, as described below, and
S( ) is a saturation function, as described below:

$$g(x) = x^{\frac{1}{\alpha}}, \text{ where } \alpha \text{ is usually } 2.2 \quad (3)$$

$$S(x) = \begin{cases} 1 & \text{if } (x > 1) \\ x & \text{if } (0 < x < 1) \\ 0 & \text{if } (x < 0) \end{cases} \quad (4)$$

Other color channels can be obtained in a similar manner. After generating the LDR layer, the precise exposure map is quantized using the function Q( ) described earlier. Thus, all inputs to the next step is fixed point (usually 8-bits).

After the decomposition is performed, the two layers are compressed in many implementations. The LDR layer can be compressed using a conventional video compressor, such as, for example, an H.264 video compressor. This performs, for example, the operation 220. The exposure map is also compressed, thus performing, for example, the operation 230. However, various techniques can be used. The exposure map is, in many implementations, a piece-wise smooth signal that has low entropy. Additionally, the inventors have observed that, in many implementations, the exposure map has a strong correlation with the LDR layer. For instance, the edges are often collocated in both the LDR layer and the exposure map. Accordingly, various techniques previously applied to compressing depth maps can be applied to compressing exposure maps.

One such technique includes joint bilateral filters as explained in PCT publication WO 2011/046607 (PCT/US10/002744), published Apr. 21, 2011, which is hereby incorporated by reference in its entirety for all purposes. Joint bilateral filtering can be applied, for example, by replacing the video image of PCT publication WO 2011/046607 with the LDR image of the present application, and by replacing the depth map of PCT publication WO 2011/046607 with the exposure map of the present application. This substitution is expected to produce good results for at least the reason that the edges of the LDR image and the exposure map are typically collocated, as are the edges of the video image and the depth map in PCT publication WO 2011/046607. Various such implementations replace the deblocking filter of PCT publication WO 2011/046607 with an in-loop filter to get better reconstructed exposure map to use as a prediction reference.

Another such technique involves geometric partitioning as explained and applied in PCT publication WO 2009/051668 (PCT/US08/011661), published Apr. 23, 2009, which is hereby incorporated by reference in its entirety for all purposes.

A further such technique includes sparse dyadic mode, and other techniques, as explained in PCT publication WO 2011/046607, which is already incorporated by reference in its entirety for all purposes. Sparse dyadic mode, as well as geometric partitioning, can be applied by finding a line for a given block, and determining a value for each part of the block on either side of the line. The line can be determined, for example, from the LDR image or from the exposure map. In one particular implementation, the line for a given block in the exposure map is determined from the reconstructed LDR image. Accordingly, the line itself need not be transmitted because the decoder can make the determination itself. In another implementation, the line for a given block of the exposure map is determined from the full exposure map. Accordingly, the line is transmitted in that implementation because the decoder cannot determine the line.

After encoding, the encoded layers can be transmitted or stored, for example. In various implementations, a decoder accesses and decodes the two layers, which are, for a given image, the LDR image and the exposure map. Thus, for example, the decoder performs the operations 310 and 320. The decoder then recomposes the HDR image (performing, for example, the operation 330) from the reconstructed LDR image the reconstructed exposure map.

In at least one implementation, recomposition occurs as follows. The decoder side decodes the LDR image and the exposure map to obtain the reconstructed versions $\tilde{L}_{x,y}$ and $\tilde{E}_{x,y}$, respectively. Here we are considering only the luminance channel. Similar equations can be obtained for the three color channels.

Then the reconstructed HDR image is obtained by:

$$\tilde{H}_{x,y} = C^* f(\tilde{L}_{x,y}) * 2^{\tilde{E}_{x,y}}$$

This is very similar to the decomposition equation listed earlier, because this is the reverse process.

Several additional particular implementations of the process 200 will now be described in more detail. Various implementations decompose an HDR signal (possibly including multiple images) into multiple layers or components. There are a number of ways to decompose an HDR signal into, for example, two layers. Several implementations are described below that decompose an HDR signal into an LDR layer and reconstruction information that indicates how the HDR signal can be reconstructed from the LDR layer, thus performing one variation of the operation 210.

Note that the exposure map of the previous implementations is also considered recomposition information that indicates how the HDR signal can be recomposed from the LDR layer.

In various implementations, an HDR image is converted to an LDR image using tone mapping, which refers generally to quantization. Various techniques can be used, such as, for example, an equation, truncation, or a look-up table. For convenience of presentation, we discuss various implementations in the context of look-up tables. However, other mechanisms are equally applicable and contemplated.

A look-up table ("LUT") can be generated for every HDR image, often referred to as global tone mapping. Alternatively, a LUT can be generated and used for multiple images, such as, for example, a sequence or a movie. Additionally, a LUT can be generated and used for less than an entire image, which is often referred to as local tone mapping. Various implementations generate and use a LUT for each slice, block, or partition.

The LUT is generated, in various implementations, by analyzing histograms for one or more HDR images. Based on the histogram of HDR values, bins are created. The bins are frequently of unequal size, and each bin of HDR values is assigned a single LDR value. When the bins are of unequal size, the bins provide a non-uniform mapping between HDR data values of an HDR image and LDR data values of an LDR image. The bins are often referred to as quantization bins.

The LUT is constructed, in different implementations, using different values. For example, the LUT uses, in various implementations, either the first or the last HDR value of each bin. The decomposer can then compare the input HDR value with the LUT values to determine the appropriate bin and LDR value.

Various implementations then encode the LDR image and the LUT, for storage or transmission. The LUT is, advantageously, not a lot of data. A LUT includes, for example, only 256 entries for an implementation that uses 8-bits for the LDR data. This is because each of the 256 possible LDR data values corresponds to one entry in the LUT. For a global tone mapping implementation that uses a separate LUT for every sequence, there are, therefore, only 256 entries (one LUT) for every sequence of images.

Various implementations form a bitstream from the encoded LDR images and the encoded LUTs. The LDR images are encoded, for example, using H.264, and the LUTs are encoded, for example, using a lossless coding scheme. Other implementations, of course, use a lossy scheme for the LUTs. The LUTs can be included in an H.264 bitstream using, for example, a supplemental enhancement information ("SEI") message, or using some form of metadata, or sent out-of-stream.

By providing the LUT to a decoder, an implementation is able to reconstruct the HDR image. This operation is performed, in various implementations, using, for example, a decoder, a re-composer, or a post-processor.

The reconstruction of the HDR image involves performing the inverse of the tone mapping operation that was performed at the encoding end. In typical implementations, each input LDR value will correspond to a particular LUT HDR value. The LUT HDR values are, in various implementations, set to the beginning of a bin, or the end of a bin. The inverse tone mapping can be performed by, for example, using that corresponding LUT HDR value, using the HDR value corresponding to the other end of the bin, or using the HDR value corresponding to the middle of the bin. A simple mathematical averaging of two adjacent LUT HDR values can be performed. However, in one implementation that uses the middle HDR value of each bin, an inverse tone mapping LUT is generated at the decoder, with the middle values as the LUT entries, as described and shown by the generated backward LUT 158.

Typical receivers also apply a dithering algorithm, or other techniques, to improve the appearance of the reconstructed HDR image. The dithering, or other processing, can reduce the quantization noise in the reconstructed HDR image.

Figure 4:
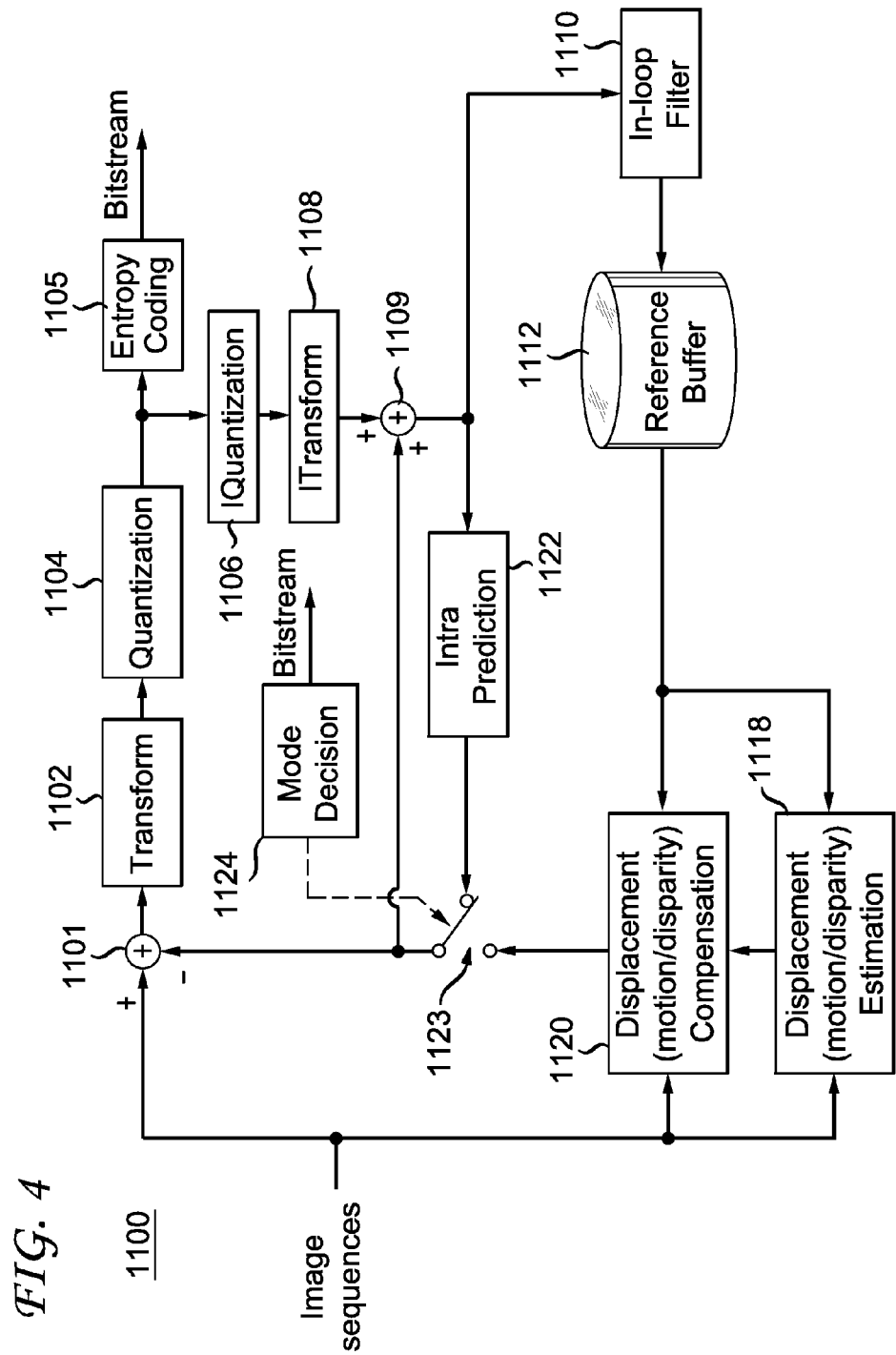
FIG. 4 is a block diagram depicting an implementation of an encoder and an encoding process.

Referring to FIG. 4, an encoder 1100 depicts an implementation of an encoder that is used, in various implementations, to encode images such as, for example, LDR images, HDR images, or exposure maps. The encoder 1100 is also used, in particular implementations, to encode data, such as, for example, metadata providing information about the encoded bitstream. Metadata can include, for example, reconstruction information such as, for example, a LUT. The encoder 1100 is implemented, in one implementation, as part of, for example, a video transmission system as described below with respect to FIG. 6. It should also be clear that the blocks of FIG. 4 provide a flow diagram of an encoding process, in addition to providing a block diagram of an encoder.

An input image sequence arrives at an adder 1101, as well as at a displacement compensation block 1120, and a displacement estimation block 1118. Note that displacement refers, for example, to either motion displacement or disparity displacement. The input image sequence is, in one implementation, an LDR layer. Another input to the adder 1101 is one of a variety of possible reference picture information items received through a switch 1123.

For example, in a first scenario a mode decision module 1124 in signal communication with the switch 1123 determines that the encoding mode should be intra-prediction with reference to a block from the same picture (for example, an LDR picture) currently being encoded. In this first scenario, the adder 1101 receives its input from an intra-prediction module 1122. Alternatively, in a second scenario, the mode decision module 1124 determines that the encoding mode should be displacement compensation and estimation with reference to a picture that is different (for example, a different time, or view, or both) from the picture currently being encoded. In this second scenario, the adder 1101 receives its input from the displacement compensation module 1120.

In various implementations, the intra-prediction module 1122 provides a predetermined predictor based on one or more blocks that are neighboring blocks to a block being encoded. In various implementations, the intra-prediction module 1122 provides a predictor (a reference) by searching within the picture being encoded for the best reference block.

More specifically, several such predictor-based implementations search within a reconstruction of those portions of the current picture that have already been encoded. In some implementations, the searching is restricted to blocks that lie on the existing block boundaries. However, in other implementations, the searching is allowed to search blocks regardless of whether those blocks cross existing block boundaries. Because of the searching, such implementations are often more time-intensive and processor-intensive than merely using predetermined neighboring blocks as the references. However, such implementations typically offer the advantage of finding a better prediction of a given block.

Such implementations may lead to a best estimate intra-prediction block. Additionally, in various implementations, the boundaries of the reference block can lie on a sub-pixel boundary, and recovery of the reference involves an interpolation step to restore the actual block to be used as reference during decoding. Depending on the content of the pictures, such sub-pixel interpolation implementations may improve compression efficiency compared to the use of neighboring blocks as references.

The adder 1101 provides a signal to a transform module 1102, which is configured to transform its input signal and provide the transformed signal to a quantization module 1104. The quantization module 1104 is configured to perform quantization on its received signal and output the quantized information to an entropy encoder 1105. The entropy encoder 1105 is configured to perform entropy encoding on its input signal to generate a bitstream. An inverse quantization module 1106 is configured to receive the quantized signal from quantization module 1104 and perform inverse quantization on the quantized signal. In turn, an inverse transform module 1108 is configured to receive the inverse quantized signal from the inverse quantization module 1106 and perform an inverse transform on its received signal. The output of the inverse transform module 1108 is a reconstruction of the signal that is output from the adder 1101.

An adder (more generally referred to as a combiner) 1109 adds (combines) signals received from the inverse transform module 1108 and the switch 1123 and outputs the resulting signal to the intra-prediction module 1122, and an in-loop filter 1110. The intra-prediction module 1122 uses the resulting signal in, for example, coding additional blocks from the current picture. The in-loop filter 1110 filters the reconstructed picture data for a given picture, providing this to a depth reference buffer 1112 as explained further below. The resulting signal is a reconstruction of the image sequence signal that is input to the encoder 1100.

The intra-prediction module 1122 performs intra-prediction, as discussed above, using its received signals. The in-loop filter 1110 filters the signals received from the adder 1109 and provides filtered signals to a reference buffer 1112. The reference buffer 1112 provides image information to the displacement estimation and compensation modules 1118 and 1120. In one implementation, the reference buffer 1112 stores reference pictures from, for example, other time instances or other views, rather than from the current picture. The in-loop filter 1110 is, in one implementation, a deblocking filter.

In one implementation, the in-loop filter 1110 uses neighboring pixels to obtain filtered results for a given pixel in the current block. In various filter designs, the neighboring pixels for a current block include pixels from a non-decoded block. Accordingly, for those filter designs, the current block cannot be filtered while it is being decoded. Additionally, certain neighboring pixels that have been decoded already cannot be filtered until the current block is decoded. As a result, at least one implementation does not use filtered results in intra-prediction. However, the implementation does use filtered results for inter-prediction because all blocks from a previous picture (a reference picture) have been decoded and can be filtered.

Metadata may be added to the encoder 1100 as encoded metadata and combined with the output bitstream from the entropy coder 1105. Alternatively, for example, unencoded metadata may be input to the entropy coder 1105 for entropy encoding along with the quantized image sequences.

Data is also provided to the output bitstream by the mode decision module 1124. The mode decision module 1124 provides information to the bitstream that indicates the mode used to encode a given block. Such information often includes an indication of the location of the reference block. For example, in various implementations that use intra-prediction and that perform a search of the current picture to find a reference block, the mode decision module 1124 indicates the location of the reference using a disparity vector. The disparity vector information may be provided to the mode decision module 1124 by the intra-prediction module 1122.

As further described below, the disparity vector information may be differentially coded using the disparity vector of a neighboring macroblock as a reference. In addition, disparity vectors for a picture may be grouped and additionally encoded to remove entropy since there is likely to be spatial similarity in disparity vectors.

Figure 5:
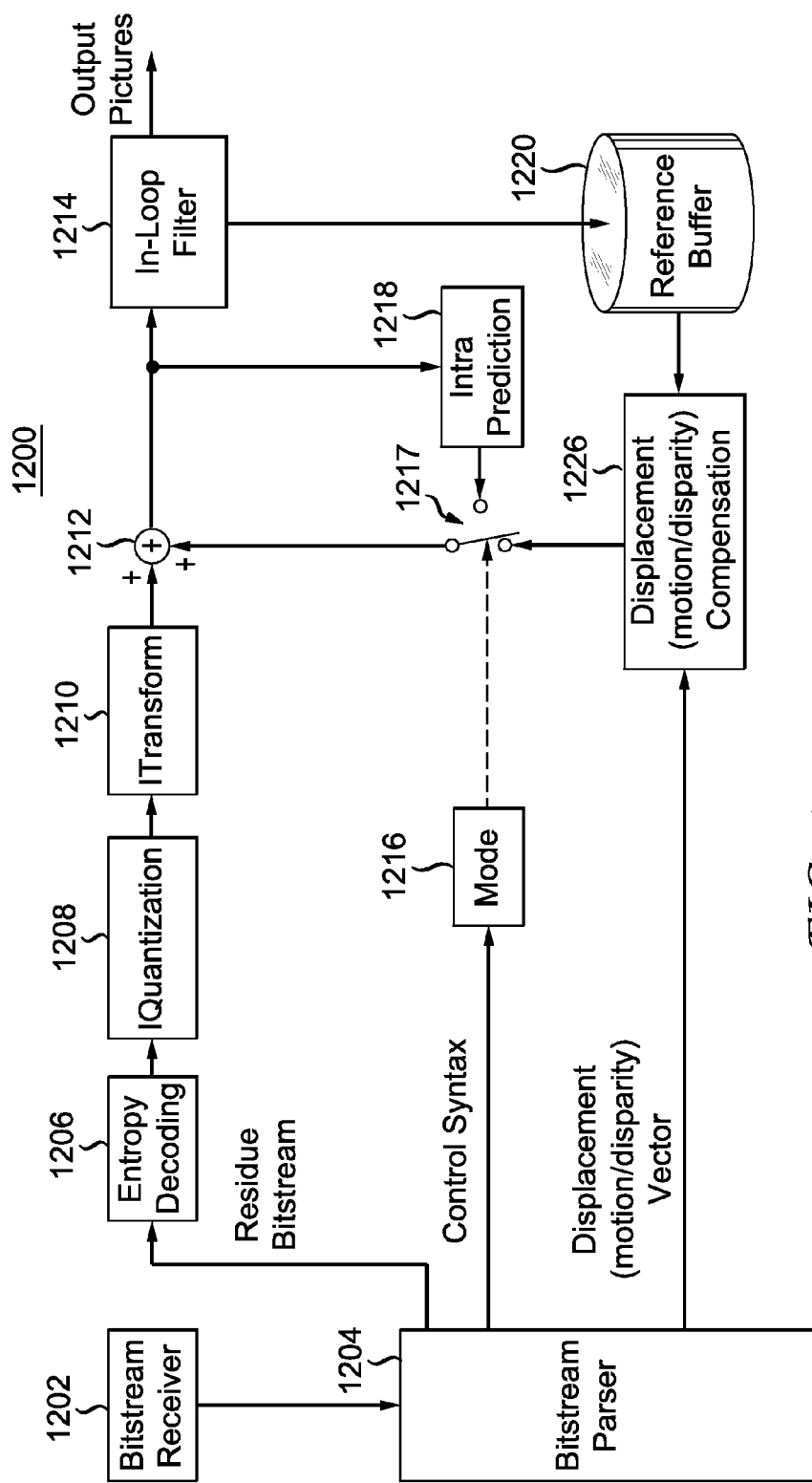
FIG. 5 is a block diagram depicting an implementation of a decoder and a decoding process.

Referring to FIG. 5, a decoder 1200 depicts an implementation of a decoder that may be used to decode images, such as, for example, LDR images. The decoded images are provided, in one implementation, to a recomposing or reconstructions device for producing HDR images based on LDR images. The decoder 1200 is used, in other implementations, for example, to decode metadata and/or to decode video data. The metadata provides information about, for example, a LUT, an exposure map, encoded video images, or the decoded bitstream. In one implementation, the decoder 1200 is implemented as part of, for example, a video receiving system as described below with respect to FIG. 7. It should also be clear that the blocks of FIG. 5 provide a flow diagram of a decoding process, in addition to providing a block diagram of a decoder.

The decoder 1200 is configured to receive a bitstream using a bitstream receiver 1202. The bitstream receiver 1202 is in signal communication with a bitstream parser 1204 and provides the bitstream to the bitstream parser 1204.

The bitstream parser 1204 is configured to transmit a residue bitstream to an entropy decoder 1206, to transmit control syntax elements to a mode selection module 1216, and to transmit displacement (motion/disparity) vector information to a displacement compensation module 1226.

The displacement vector information may be, for example, motion vector information or disparity vector information. Motion vector information is typically used in inter-prediction to indicate relative motion from a previous image. Disparity vector information is typically used in either (i) inter-prediction to indicate disparity with respect to a separate image or (ii) intra-prediction to indicate disparity with respect to a portion of the same image. As is known in the art, disparity typically indicates the relative offset, or displacement, between two images. Disparity may also be used to indicate the relative offset, or displacement, between two portions of an image.

An inverse quantization module 1208 performs inverse quantization on an entropy decoded signal received from the entropy decoder 1206. In addition, an inverse transform module 1210 is configured to perform an inverse transform on an inverse quantized signal received from the inverse quantization module 1208 and to output the inverse transformed signal to an adder (also referred to as a combiner) 1212.

The adder 1212 can receive one of a variety of other signals depending on the decoding mode employed. For example, in one implementation, the mode decision module 1216 determines whether displacement compensation or intra-prediction encoding was performed by the encoder on the currently processed block by parsing and analyzing the control syntax elements. Depending on the determined mode, the mode selection control module 1216 accesses and controls a switch 1217, based on the control syntax elements, so that the adder 1212 receives signals from the displacement compensation module 1226, or an intra-prediction module 1218.

Here, the intra-prediction module 1218 is configured to perform intra-prediction to decode a block using references to the same picture currently being decoded. In turn, the displacement compensation module 1226 is configured to perform displacement compensation to decode a block using references to a block of another previously processed picture (from a different time or view, or both, for example) that is different from the picture currently being decoded.

After receiving prediction or compensation information signals, the adder 1212 adds the prediction or compensation information signals with the inverse transformed signal for transmission to an in-loop filter 1214. The in-loop filter 1214 is, for example, a deblocking filter that filters out blocking artifacts. The adder 1212 also outputs the added signal to the intra-prediction module 1218 for use in intra-prediction.

The in-loop filter 1214 is configured to filter its input signal and output decoded pictures. Further, the in-loop filter 1214 provides the filtered signal to a reference buffer 1220. The reference buffer 1220 is configured to parse its received signal to permit and aid in displacement compensation decoding by the displacement compensation module 1226, to which the reference buffer 1220 provides parsed signals. Such parsed signals may be, for example, all or part of various pictures that may have been used as a reference. Metadata may be included in a bitstream provided to the bitstream receiver 1202. The metadata may be parsed by the bitstream parser 1204, and decoded by the entropy decoder 1206. The decoded metadata may be extracted from the decoder 1200 after the entropy decoding using an output (not shown).

In at least one implementation, many of the blocks of FIG. 5 perform inverse operations of corresponding blocks in FIG. 4. For example, in one implementation:
  the entropy decoder 1206 performs the inverse of the entropy encoder 1105,
  the inverse quantization module 1208 performs the inverse of the quantization module 1104, and
  the inverse transform module 1210 performs the inverse of the transform module 1102.

Further, as already indicated above, in at least one implementation, many of he blocks of FIG. 5 perform the same operations as corresponding blocks in FIG. 4. For example, in one implementation:
  the in-loop filter 1214 performs the same operations as the in-loop filter 1110,
  the intra-prediction module 1218 performs the same operations as the intra-prediction module 1122, and
  the displacement compensation module 1226 performs the same operations as the displacement compensation module 1120.

Figure 6:
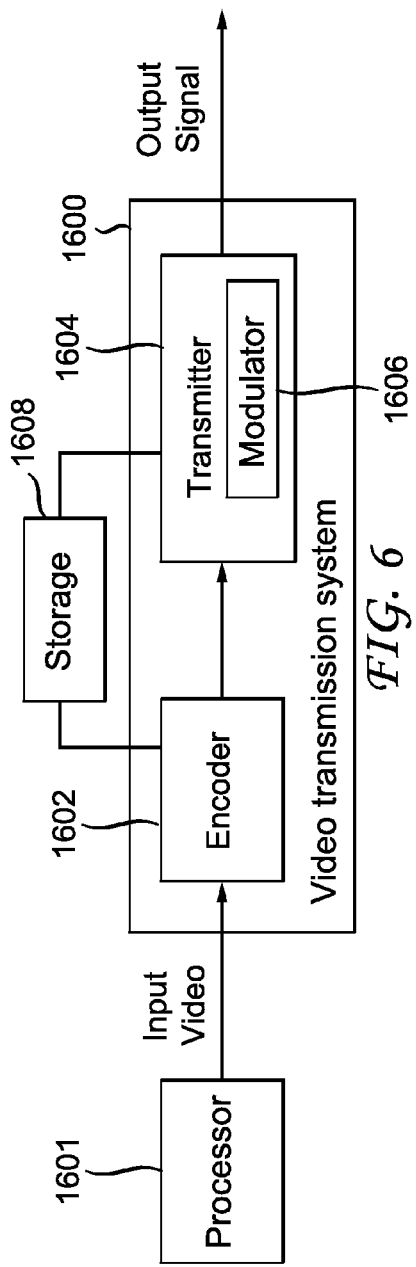
FIG. 6 is a block diagram depicting an implementation of a transmission system and process that may be used with one or more implementations.

Referring now to FIG. 6, a video transmission system or apparatus 1600 is shown, to which the features and principles described above may be applied. The video transmission system or apparatus 1600 may be, for example, a head-end or transmission system for transmitting a signal using any of a variety of media, such as, for example, satellite, cable, telephone-line, or terrestrial broadcast. The video transmission system or apparatus 1600 also, or alternatively, may be used, for example, to provide a signal for storage. The transmission may be provided over the Internet or some other network. The video transmission system or apparatus 1600 is capable of generating and delivering, for example, video content and other content such as, for example, metadata. It should also be clear that the blocks of FIG. 6 provide a flow diagram of a video transmission process, in addition to providing a block diagram of a video transmission system or apparatus.

The video transmission system or apparatus 1600 receives input video from a processor 1601. In one implementation, the processor 1601 simply provides video images, such as LDR images, to the video transmission system or apparatus 1600. However, in another implementation, the processor 1601 alternatively, or additionally, provides exposure maps and/or LUTs, to the video transmission system or apparatus 1600. The processor 1601 may also provide metadata to the video transmission system or apparatus 1600, in which the metadata relates, for example, to one or more of the input images, and may include, for example, a LUT.

The video transmission system or apparatus 1600 includes an encoder 1602 and a transmitter 1604 capable of transmitting the encoded signal. The encoder 1602 receives video information from the processor 1601. The video information may include, for example, video images, and/or exposure maps. The encoder 1602 generates an encoded signal(s)

based on the video and/or other information. The encoder 1602 is, in one implementation, the encoder 1100 of FIG. 4. In various implementations, the encoder 1602 is, for example, an AVC encoder.

The encoder 1602 may include sub-modules, including for example an assembly unit for receiving and assembling various pieces of information into a structured format for storage or transmission. The various pieces of information may include, for example, encoded or unencoded video, exposure map values, LUTs, other metadata or information, and various elements such as, for example, motion vectors, coding mode indicators, and syntax elements. In some implementations, the encoder 1602 includes the processor 1601 and therefore performs the operations of the processor 1601.

The transmitter 1604 receives the encoded signal(s) from the encoder 1602 and transmits the encoded signal(s) in one or more output signals. The transmitter 1604 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1606. The transmitter 1604 may include, or interface with, an antenna (not shown). Further, implementations of the transmitter 1604 may be limited to the modulator 1606.

The video transmission system or apparatus 1600 is also communicatively coupled to a storage unit 1608. In one implementation, the storage unit 1608 is coupled to the encoder 1602, and the storage unit 1608 stores an encoded bitstream from the encoder 1602 and, optionally, provides the stored bitstream to the transmitter 1604. In another implementation, the storage unit 1608 is coupled to the transmitter 1604, and stores a bitstream from the transmitter 1604. The bitstream from the transmitter 1604 may include, for example, one or more encoded bitstreams that have been further processed by the transmitter 1604. The storage unit 1608 is, in different implementations, one or more of a standard DVD, a Blu-Ray disc, a hard drive, or some other storage device.

In various implementations, the video transmission system or apparatus 1600 performs the process 200. For example, the processor 1601 performs the operation 210, and the encoder 1602 performs the operations 220 and 230.

Figure 7:
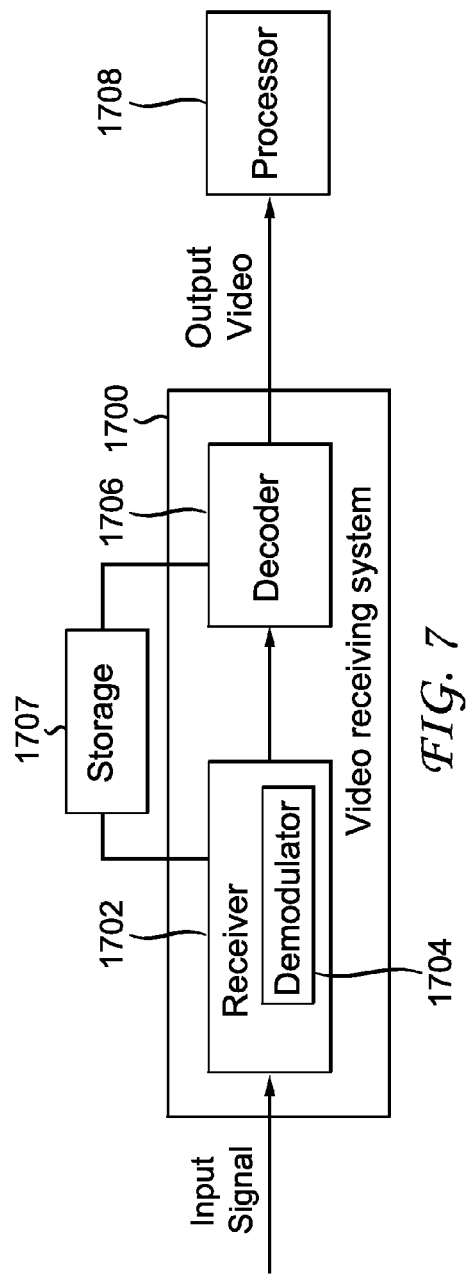
FIG. 7 is a block diagram depicting an example of a receiving system and process that may be used with one or more implementations.

Referring now to FIG. 7, a video receiving system or apparatus 1700 is shown to which the features and principles described above may be applied. The video receiving system or apparatus 1700 may be configured to receive signals over a variety of media, such as, for example, satellite, cable, telephone-line, or terrestrial broadcast. The signals may be received over the Internet or some other network. It should also be clear that the blocks of FIG. 7 provide a flow diagram of a video receiving process, in addition to providing a block diagram of a video receiving system or apparatus.

The video receiving system or apparatus 1700 may be, for example, a cell-phone, a computer, a set-top box, a television, or other device that receives encoded video and provides, for example, decoded video signal for display (display to a user, for example), for processing, or for storage. Thus, the video receiving system or apparatus 1700 may provide its output to, for example, a screen of a television, a computer monitor, a computer (for storage, processing, or display), or some other storage, processing, or display device.

The video receiving system or apparatus 1700 is capable of receiving and processing video information. The video information may include, for example, video images, LUTs, and/or exposure maps. The video receiving system or apparatus 1700 includes a receiver 1702 for receiving an encoded signal, such as, for example, the signals described in the implementations of this application. The receiver 1702 may receive, for example, a signal providing one or more LDR images, HDR images, LUTs, and/or exposure maps, or a signal output from the video transmission system 1600 (for example, from the storage unit 1608 or the transmitter 1604) of FIG. 6.

The receiver 1702 may be, for example, adapted to receive a program signal having a plurality of bitstreams representing encoded pictures (for example, video pictures or depth pictures). Typical receivers perform functions such as, for example, one or more of receiving a modulated and encoded data signal, demodulating the data signal from one or more carriers using a demodulator 1704, de-randomizing the energy in the signal, de-interleaving the data in the signal, and error-correction decoding the signal. The receiver 1702 may include, or interface with, an antenna (not shown). Implementations of the receiver 1702 may be limited to the demodulator 1704.

The video receiving system or apparatus 1700 includes a decoder 1706. The decoder 1706 is, in one implementation, the decoder 1200 of FIG. 5.

The receiver 1702 provides a received signal to the decoder 1706. The signal provided to the decoder 1706 by the receiver 1702 may include one or more encoded bitstreams. The decoder 1706 outputs a decoded signal, such as, for example, decoded video signals including video information, exposure maps, LUTs, or other metadata or reconstruction information. The decoder 1706 may be, for example, an AVC decoder.

The video receiving system or apparatus 1700 is also communicatively coupled to a storage unit 1707. In one implementation, the storage unit 1707 is coupled to the receiver 1702, and the receiver 1702 accesses a bitstream from the storage unit 1707 and/or stores a received bitstream to the storage unit 1707. In another implementation, the storage unit 1707 is coupled to the decoder 1706, and the decoder 1706 accesses a bitstream from the storage unit 1707 and/or stores a decoded bitstream to the storage unit 1707. The bitstream accessed from the storage unit 1707 includes, in different implementations, one or more encoded bitstreams. The storage unit 1707 is, in different implementations, one or more of a standard DVD, a Blu-Ray disc, a hard drive, or some other storage device.

The output video from the decoder 1706 is provided, in one implementation, to a processor 1708. The processor 1708 is, in one implementation, a processor configured for performing reconstruction or recomposition of HDR images. In some implementations, the decoder 1706 includes the processor 1708 and therefore performs the operations of the processor 1708. In other implementations, the processor 1708 is part of a downstream device such as, for example, a set-top box or a television.

In various implementations, the video receiving system or apparatus 1700 performs the process 300. For example, the decoder 1706 performs the operations 310 and 320, and the processor 1708 performs the operation 330.

This application provides multiple block and/or flow diagrams, including the diagrams of FIGS. 1-7. It should be clear that the block and/or flow diagrams of this application present both a flow diagram describing a process, and a block diagram describing functional blocks of an apparatus.

For example, as previously described, the flow diagram of FIG. 1 describes a flow process, including the operations listed in FIG. 1. However, FIG. 1 also provides a block diagram for implementing that flow. In one implementation, for example, (i) the block for the HDR image 110 represents an image receiving device, (ii) the block for the LDR image 112 represents a decomposing component that generates an LDR image, (iii) the block for the encoded LDR image 122 represents an encoder, (iv) the block for the LDR signal portion 132 represents a bitstream generator, and (v) the block for the reconstructed LDR image 142 represents a decoder. In this implementation, the other blocks in FIG. 1 are interpreted in a similar manner, to provide a complete block diagram for implementing the flow.

For example, as previously described, the flow diagram of FIG. 2 describes a flow process, including the operations listed in FIG. 2. However, FIG. 2 also provides a block diagram for implementing that flow. In one implementation, for example, the blocks for each of the operations 210-230 each represent a component for performing the respective operation. That is, for example, the block for the operation 210 represents a component for performing the operation of decomposing an HDR image into an LDR image and reconstruction information. In another implementation, FIG. 3 is interpreted in a similar manner to that just described for FIG. 2.

For example, as previously described, the block diagram of FIG. 4 describes a system or apparatus, including the components shown in FIG. 4. However, FIG. 4 also provides a flow diagram for performing the functions of the blocks. In one implementation, for example, (i) the block for the transform module 1102, which is a component, represents the operation of performing a transform, and (ii) the block for the in-loop filter 1110 (also a component) represents the operation of performing in-loop filtering. In this implementation, the other blocks in FIG. 4 are interpreted in a similar manner, to provide a complete flow diagram for performing the functions of the blocks. In other implementations, FIGS. 5-7 are interpreted in a similar manner to that just described for FIG. 4.

We thus provide one or more implementations having particular features and aspects. In particular, we provide several implementations relating to decomposition and recomposition (or reconstruction) of HDR images. However, variations of these implementations and additional applications are contemplated and within our disclosure, and features and aspects of described implementations may be adapted for other implementations.

Several of the implementations and features described in this application may be used in the context of the AVC Standard, and/or AVC with the MVC extension (Annex H), and/or AVC with the SVC extension (Annex G). Additionally, these implementations and features may be used in the context of another standard (existing or future), or in a context that does not involve a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, an exposure map, a disparity map for a 2D video picture, a depth map that corresponds to a 2D video picture, or an edge map.

"Exposure map", "depth map", "disparity map", "edge map", and similar terms are also intended to be broad terms. A map generally refers, for example, to a set of data that includes a particular type of information. However, a map may include other types of information not indicated by its name. For example, a depth map typically includes depth information, but may also include other information such as, for example, video or edge information. Further, a map, such as, for example, an exposure map or a depth map, need not be visually useful or meaningful as a video image would be. However, a map can, and often does, provide visually useful or meaningful information. For example, a depth map typically provides an image from which objects and depth can be ascertained by the human eye.

The term "layer" is used in this document to refer, for example, to an HDR layer, an LDR layer, and an exposure map layer. A layer can include a variety of different elements. Typically, an HDR layer, for example, includes an HDR image. More generally, the HDR layer is the layer, or level, in an organizational or hierarchical sense, that includes an HDR element such as, for example, an HDR image.

A "signal" refers, for example, to a bitstream. Accordingly, an HDR signal typically includes a bitstream representing an HDR element such as, for example, an HDR image, from an HDR layer.

The terms "neighbor" and "neighboring" are used throughout this application. A first block or pixel, as examples, are said to be a neighbor to a second block or pixel if the first block or pixel touches the second block or pixel. Therefore, a given block or pixel generally has eight neighbors, including the block or pixel to the left, to the right, above, below, and at the four corners.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 1100 or 1602), a decoder (for example, the decoder 1200 or 1706), a post-processor (for example, the processor 1708) processing output from a decoder, or a pre-processor (for example, the processor 1601) providing input to an encoder. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, HDR processing, view generation, depth or disparity processing, and other processing of images and related depth and/or disparity maps. Examples of such equipment include an encoder, a decoder, a post-processor processing output from a decoder, a pre-processor providing input to an encoder, a video coder, a video decoder, a video codec, a web server, a set-top box, an HDR TV or other HDR display device, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading syntax, or to carry as data the actual syntax-values generated using the syntax rules. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:
1. A method comprising:
   receiving a higher dynamic range image;
   generating, from said higher dynamic range image, a lower dynamic range image and an exposure map allowing the higher dynamic range image to be reconstructed from the lower dynamic range image, wherein said exposure map includes a multiplier for each pixel of said lower dynamic range image;
   imposing a smoothing constraint on said exposure map to generate a smoothed exposure map;
   encoding the lower dynamic range image;
   encoding the smoothed exposure map; and,
   transmitting said lower dynamic range image and said smoothed exposure map.
2. The method of claim 1 wherein:
   the encoding of one or more of the lower dynamic range image and the smoothed exposure map exploits correlation between the lower dynamic range image and the smoothed exposure map.

3. The method of claim 2 wherein the correlation comprises a collocated edge in both the lower dynamic range image and the exposure map.

4. The method of claim 2 wherein the exposure map is encoded based on a reconstruction of the lower dynamic range image.

5. The method of claim 2 wherein the exposure map is encoded using one or more of (i) joint bilateral filtering, (ii) geometric partitioning, or (iii) sparse dyadic mode.

6. The method of claim 2 wherein generating the lower dynamic range image and the information comprises:
generating the exposure map using the higher dynamic range image; and
generating the lower dynamic range image using the exposure map.

7. The method of claim 2 wherein generating the lower dynamic range image and the information comprises:
generating the lower dynamic range image using the higher dynamic range image; and
generating the exposure map using the lower dynamic range image.

8. The method of claim 1 wherein:
generating the lower dynamic range image comprises converting the higher dynamic range image into the lower dynamic range image using a non-uniform mapping between data values of the higher dynamic range image and data values of the lower dynamic range image, and
the exposure map describes one or more of (i) the non-uniform mapping or (ii) an inverse conversion allowing a reconstruction of the higher dynamic range image.

9. The method of claim 8 wherein the information comprises a look-up table indicating ranges of higher dynamic range data values and associated lower dynamic range data values.

10. The method of claim 8 wherein the information comprises a look-up table indicating a reconstructed higher dynamic range data value associated with a particular lower dynamic range data value.

11. The method of claim 1 further comprising constructing a bitstream that includes the encoded lower dynamic range image and the encoded exposure map.

12. The method of claim 11 wherein constructing the bitstream comprises including the encoded information as metadata.

13. The method of claim 11 wherein constructing the bitstream comprises including the encoded information as a supplemental enhancement information message.

14. The method of claim 1 wherein encoding the lower dynamic range image comprises encoding the lower dynamic range image using H.264.

15. The method of claim 1 wherein:
generating the lower dynamic range image and the exposure map comprises decomposing the higher dynamic range image, and
the exposure map allows the higher dynamic range image to be recomposed from the lower dynamic range image.

16. An apparatus comprising:
a receiver of a higher dynamic range image;
a processor configured to generate, from the higher dynamic range image, a lower dynamic range image and an exposure map allowing the higher dynamic range image to be reconstructed from the lower dynamic range image, wherein said processor imposes a smoothing constraint on said exposure map to generate a smoothed exposure map and said exposure map includes a multiplier for each pixel of said lower dynamic range image; and
an encoder configured to encode the lower dynamic range image and to encode the smoothed exposure map.

17. An apparatus comprising:
a receiver of a higher dynamic range image;
means for generating, from the higher dynamic range image, a lower dynamic range image and an exposure map allowing a reconstruction of the higher dynamic range image from the lower dynamic range image, wherein said means for generating imposes a smoothing constraint on said exposure map to generate a smoothed exposure map and said exposure map includes a multiplier for each pixel of said lower dynamic range image;
means for encoding the lower dynamic range image; and
means for encoding the smoothed exposure map.

18. A non-transitory processor readable medium having stored thereon instructions for causing one or more processors to collectively perform:
generating, from a higher dynamic range image, a lower dynamic range image and an exposure map allowing a reconstruction of the higher dynamic range image from the lower dynamic range image, wherein said exposure map includes a multiplier for each pixel of said lower dynamic range image;
imposing a smoothing constraint on said exposure map to generate a smoothed exposure map;
encoding the lower dynamic range image;
encoding the smoothed exposure map; and,
transmitting said lower dynamic range image and said smoothed exposure map.

19. A method comprising:
receiving an encoded lower dynamic range image and an encoded exposure map;
decoding the encoded lower dynamic range image;
decoding the encoded exposure map, the decoded exposure map allowing a reconstruction of a higher dynamic range image from the lower dynamic range image, wherein said decoded exposure map includes a multiplier for each pixel of said lower dynamic range image and wherein a smoothing constraint has been imposed on said decoded exposure map; and reconstructing the higher dynamic range image based on the decoded lower dynamic range image and the decoded exposure map.

20. The method of claim 19 wherein:
the decoding of one or more of the lower dynamic range image and the exposure map exploits correlation between the lower dynamic range image and the exposure map, and
decoding the exposure map is based on the decoding of the lower dynamic range image.

21. The method of claim 19 wherein:
the exposure map describes a non-uniform mapping, between higher dynamic range data values and lower dynamic range data values, used to generate the lower dynamic range image from a higher dynamic range image.

22. The method of claim 19 wherein:
the exposure map describes a non-uniform mapping, between higher dynamic range data values and lower dynamic range data values, allowing a reconstruction of a higher dynamic range image from the lower dynamic range image.

23. The method of claim 19 wherein:
the exposure map comprises a non-uniform mapping between lower dynamic range data values and higher dynamic range data values, and
reconstructing the higher dynamic range image comprises generating higher dynamic range data values using (i) the non-uniform mapping and (ii) lower dynamic range data values from the lower dynamic range image.

24. The method of claim 19 wherein:
the exposure map comprises a non-uniform mapping between higher dynamic range data values and lower dynamic range data values, and
reconstructing the higher dynamic range image comprises (i) generating an inverse mapping based on the non-uniform mapping, and (ii) generating higher dynamic range data values using the inverse mapping and lower dynamic range data values from the decoded lower dynamic range image.

25. The method of claim 19 wherein decoding the exposure map comprises decoding one or more of an SEI message or metadata.

26. The method of claim 19 wherein:
decoding the encoded lower dynamic range image comprises accessing the encoded lower dynamic range image from a received bitstream, and
decoding the exposure map comprises accessing the encoded exposure map from the received bitstream.

27. The method of claim 19 wherein:
the exposure map allows a recomposition of the higher dynamic range image from the lower dynamic range image, and
reconstructing the higher dynamic range image comprises recomposing the higher dynamic range image based on the decoded lower dynamic range image and the decoded exposure map.

28. An apparatus comprising:
a receiver of an encoded lower dynamic range image and an encoded exposure map;
a decoder configured to decode the encoded lower dynamic range image, and to decode the encoded exposure map, the decoded exposure map allowing a reconstruction of a higher dynamic range image from the lower dynamic range image, wherein said decoded exposure map includes a multiplier for each pixel of said lower dynamic range image and wherein a smoothing constraint has been imposed on said decoded exposure map; and a processor configured to reconstruct the higher dynamic range image based on the decoded lower dynamic range image and the decoded exposure map.

29. An apparatus comprising:
means for receiving an encoded lower dynamic range image and an encoded exposure map;
means for decoding the encoded lower dynamic range image;
means for decoding the encoded exposure map, the decoded exposure map allowing a reconstruction of a higher dynamic range image from the lower dynamic range image, wherein said decoded exposure map includes a multiplier for each pixel of said lower dynamic range image and wherein a smoothing constraint has been imposed on said decoded exposure map; and
means for reconstructing the higher dynamic range image based on the decoded lower dynamic range image and the decoded exposure map.

30. A non-transitory processor readable medium having stored thereon instructions for causing one or more processors to collectively perform:
decoding an encoded lower dynamic range image;
decoding an encoded exposure map, the exposure map allowing a reconstruction of a higher dynamic range image from the lower dynamic range image, wherein said exposure map includes a multiplier for each pixel of said lower dynamic range image and wherein a smoothing constraint has been imposed on said exposure map; and
reconstructing the higher dynamic range image based on the decoded lower dynamic range image and the decoded exposure map.

* * * * *